United States Patent [19]

Zwirner

[11] Patent Number: 4,743,328
[45] Date of Patent: May 10, 1988

[54] METHOD AND APPARATUS FOR MANUFACTURING A CUSHIONING MEMBER

[75] Inventor: Gerhard Zwirner, Haan, Fed. Rep. of Germany

[73] Assignee: Gebr. Happich GmbH, Fed. Rep. of Germany

[21] Appl. No.: 918,836

[22] Filed: Oct. 14, 1986

[30] Foreign Application Priority Data

Oct. 18, 1985 [DE] Fed. Rep. of Germany ....... 3537169

[51] Int. Cl.⁴ .............................................. B32B 31/18
[52] U.S. Cl. ................................. 156/274.4; 156/245; 156/380.3; 156/380.4; 156/380.7; 156/500; 156/530
[58] Field of Search ............... 156/274.4, 380.2, 380.3, 156/380.4, 380.6, 380.7, 518, 530, 581, 251, 515, 245, 500

[56] References Cited

U.S. PATENT DOCUMENTS 4,451,721  5/1984  Nemeskeri ...................... 156/274.4

FOREIGN PATENT DOCUMENTS 87322   5/1982  Japan .................................. 156/380.3
28328   2/1983  Japan .................................. 156/274.4

*Primary Examiner*—Caleb Weston
*Attorney, Agent, or Firm*—Ostrolenk, Faber, Gerb & Soffen

[57] ABSTRACT

A method and an apparatus for wrapping a cushioning member, particularly a sun visor, with a web of wrapping material formed from two blanks, in which one blank is placed on one main surface of the cushioning member and the second blank is placed on its other main surface. Each blank forms a continuously protruding flange in the center plane of the cushioning member. The flanges are clamped between two opposed web electrodes, and the flanges are welded peripherally to each other by high-frequency welding in such a manner than an inward-directed weld bead is formed by the flow of material at the flange edges facing the member. After the termination of the welding process, that is, after the disconnecting of the high-frequency voltage, the flanges remain clamped between the electrodes, possibly with an increase in the clamping pressure. Then the cushioning member is moved, by a punch that is movable perpendicular to the flanges, and is punched out (ejected) from the flanges, by being sheared from the flanges in the immediate vicinity of the flange edges facing the member, the web electrodes serving as auxiliary tools for the punch, one serving as a holder and the other as a die.

13 Claims, 1 Drawing Sheet

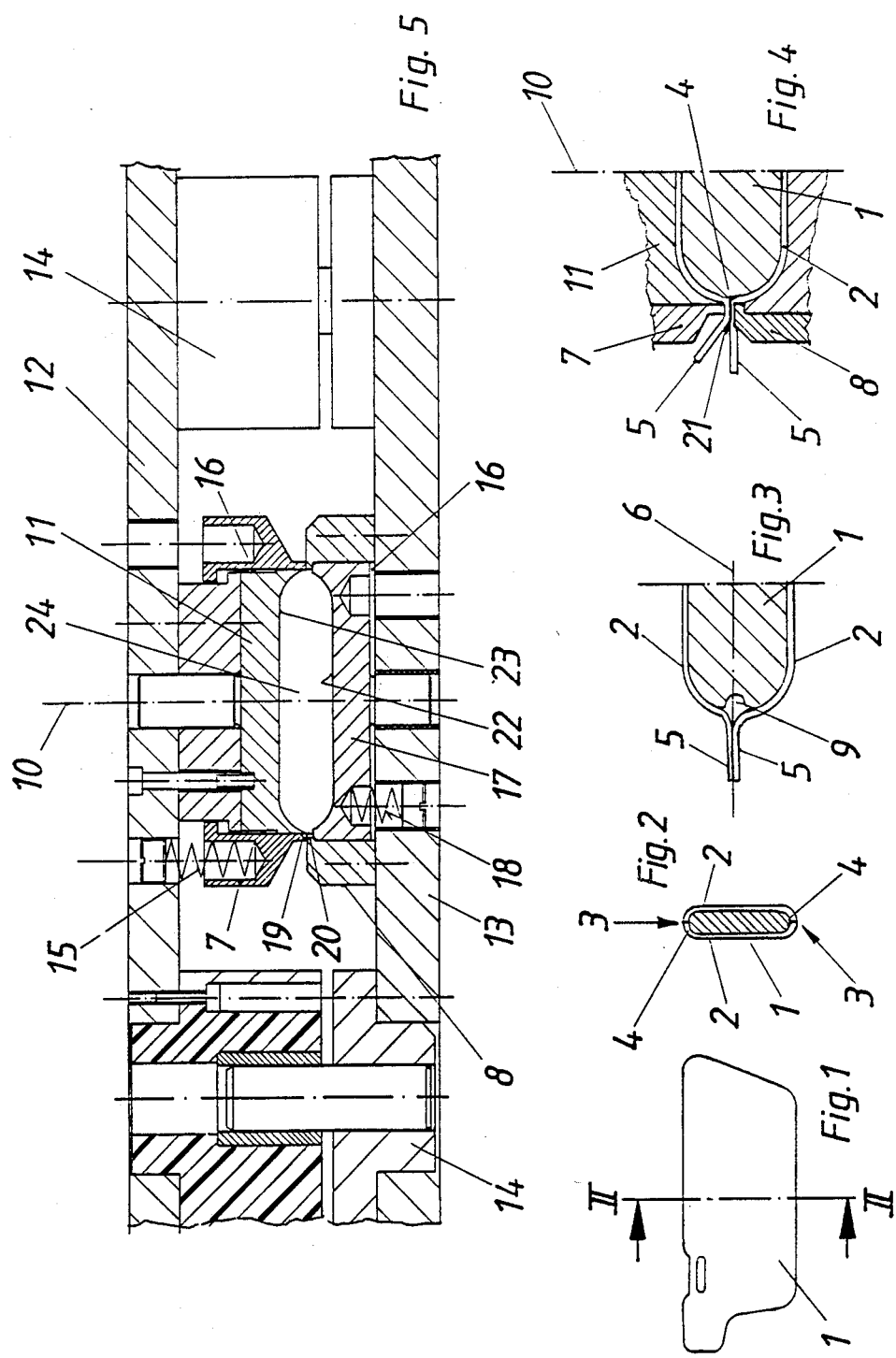

METHOD AND APPARATUS FOR MANUFACTURING A CUSHIONING MEMBER

BACKGROUND OF THE INVENTION

1. Field of the Invention

The present invention relates to a method of manufacturing a cushioning member such as a sun visor. More particularly, it relates to a method of wrapping a cushioning member in a web of wrapping material formed from two blanks. One blank is placed on one main surface of the cushioning member and the second blank is placed on its other main surface, each blank forming a peripherally protruding flange at the center plane of the cushioning member. The flanges are clamped between two web electrodes which face each other and are welded peripherally to each other by high-frequency welding so as to form an inwardly directed weld bead by the flow of material at the flange edges facing the member. The invention also relates to an apparatus for carrying out this method.

2. Description of Related Art

In the manufacture of equipment parts of automotive vehicles which serve as a cushioning members, such as head rests, arm rests, and sun visors, as well as similar articles outside the automotive industry, PVC foils which are connected to each other by high-frequency welding are frequently used as wrapping material. High-frequency welding of plastic material is obtained by the dielectric heating of nonconductive polar substances in a high-frequency electrical field. This is a reliable and rapid method which has the further advantage that the weld excess can be torn off, without the use of a special tool, along a residual film directly after the welding. Thus, a clean, smooth weld seam remains which requires little or not additional working.

However, this is not possible when the dielectric weld material consists in part of fabric, leather or the like which is to be included in the weld or anchored in the thermoplastic foil.

There are several reasons for this problem. First of all, ordinary flat textile structures, as well as leather or other non-plastic materials, cannot be welded with high frequency and must therefore be coated with a material that can be welded by high frequency, so as to make such materials attachable to a base or to each other. More serious, however, is the problem that it is not possible to tear off the weld residue when using these materials. In the case of a coated textile material, for instance, the fibrous material is not softened by the high-frequency welding, and thus cannot easily be torn. Such coated textile material (as well as leather or the like) therefore must be cut around the weld seam or be removed from the weld residue by stamping. Three methods for this have become known (see HF SCHWEISS-TECHNIK, G. F. ABELE, ZECHNER & HUTHIG VERLAG, SPEYER, 1965 pages 269–275).

In the first method, the stamping tool also serves as the welding electrode. This tool is first of all brought, together with the material, to the welding press and then to the die.

In the second method, in order to obtain a strong weld connection, the welding tool and the stamping tool are functionally or even spatially separate. In forming such a connection, assuming such spatial separation, a web weld is first effected on a standard welding press and the welded material is removed from the electrode or press and fed to a stamping tool.

The necessity of repeated insertion operations in these first and second methods led to the desire to rationalize and simplify this manufacturing field. A further desire was to eliminate uncertainty as to whether the stamping was being effected with proper register. The result was a third method, in which a combined welding-stamping tool is brought, charged with material, to welding and stamping presses in succession. The welding and stamping presses may be arranged, in actual practice, around a rotary table.

In these known methods, which appear without exception to be rather expensive, a weld rim of excess weld material always remains, which constitutes a disadvantage. Another particular disadvantage resides in the fact that the stamping knives must always cooperate with a stamping plate. In view of the fact that a non-thermoplastic semi-finished product (leather, flat textile structure, or the like) can be cut only with a high stamping pressure, it is necessary to use particularly hard steel tools which stamp against an even harder steel bottom plate.

In general, the trend can be noted in the automobile industry toward manufacturing equipment parts of the aforementioned types so as to have a uniform appearance. If a ceiling covering, for instance, consists of a textile material, as is increasingly the case, then the sun visor should also be wrapped with this same textile material. Yet, it has been inconvenient to manufacture such uniform parts in the past, for the reasons already mentioned.

SUMMARY OF THE INVENTION

A basic object of the present invention is to provide a method by which cushioning members can be wrapped with any desired material, such as PVC foils, coated textile surfaces (woven or knitted fabrics), leather or the like.

A further object is to obtain such products without any rim or excess weld material, and with few burrs in the region of the weld seam.

Another object is to provide a rapid, simple process which is also inexpensive, and avoids the above-mentioned difficulties of the prior art.

It is a further object of the invention to provide an apparatus for carrying out this method.

A method in accordance with an embodiment of the invention, for the solution of these problems, includes the following. After the termination of the coating and welding process, that is, after the high-frequency welding voltage has been turned off, the flanges remain clamped between the electrodes, possibly with an increase in the clamping pressure. The cushioning member is moved, by a punch, perpendicular to the flanges and, using the web electrodes as auxiliary tools, one serving as a holder and the other as a die, is punched out from the excess material flanges in the immediate vicinity of the flange edges facing the member.

A particular advantage of the method of the invention is that the weld residue or flange is practically completely removed, and this is a particular advantage when the wrapping consists in part of textile structures, leather, or other non-thermoplastic materials. The weld of the cushioning member wrapped in accordance with the method of the invention is practically unnoticeable—as tests have shown—both visually and by feel, and it corresponds in effect to a butt seam. Since punching is a process similar to shearing, the forces to be applied for the punching are relatively slight, particularly as compared with the forces which must be employed in order to separate the flange from the cushioning member by means of a stamping knife which acts against an underlying plate.

Furthermore, the invention is a radical departure from the prior art, in that the useful part of the product (cushioning member) is moved away from the waste strip (flange) while heretofore the reverse was always the case.

The apparatus provided for the carrying out of the method has two web electrodes facing each other and movable relative to each other along an axial center line. The two web electrodes together form a receiving space which corresponds to the contour of the cushioning member. In accordance with an aspect of the invention, within the half receiving space formed by one of the electrodes, there is arranged a punch which is movable along the axial center line. During the operating stroke, a cutting edge of the punch, which forms a closed line, shears along the inner rim edge of the opposite web electrode which serves as a die.

As a result of this development of the apparatus according to the invention, the electrodes are used for two purposes, namely, on the one hand, for their basic task of producing the weld seam and, on the other hand, as part of a punch, so that one electrode (the upper one) serves as a holder, while the other electrode (the lower one) serves as a die. The apparatus of the invention thus represents a combined welding and stamping tool which is simple and inexpensive to manufacture and which can be operated simply and rapidly as well as extremely cleanly, particularly with respect to the formation of burrs, which it is an object of the invention to avoid.

In accordance with a further advantageous feature of the invention, a support member is provided for the cushioning member, which support member is movable along the axial center line against the force of return springs. The support member is arranged in the half of the receiving space which faces and is opposite to the punch.

Another advantageous development of the invention resides in the fact that the sides of the punch and the support member which face each other have trough-like recesses which coact to form a mold cavity which closely surrounds the cushioning member, except for a slot which lies in the center plane of the cushioning member and is intended for the passage of the flanges of the wrapping material blanks, the slot being adapted to be bridged by a stroke movement of the punch and the punching of the cushioning member out of the flanges.

BRIEF DESCRIPTION OF THE DRAWINGS

Illustrative embodiments of the invention will now be explained in further detail, with reference to the drawings, in which:

FIG. 1 shows a cushioning member having the specific form a sun visor, which has been wrapped by the method of the invention;

FIG. 2 is a section along line II—II of FIG. 1;

FIG. 3 is a sectional view of a cushioning member which is covered by a blank of wrapping material of each of its main surfaces;

FIG. 4 shows the cushioning member of FIG. 3 retained in a welding-punching device after a welding operation has been performed; and FIG. 5 shows an embodiment of an apparatus for practicing the method of the invention.

DETAILED DESCRIPTION OF THE EMBODIMENTS

FIGS. 1 and 2 show an automobile sun visor which comprises a cushioning member 1 formed of foam plastic and having a wrapping formed of two blanks 2 of a web of wrapping material. The wrapping material may comprise, for example, a PVC (polyvinyl chloride) foil, a flat textile product coated with a material that can be welded by a high frequency voltage, a plastic fiber web that may also be coated, or coated leather. The blanks 2 are attached to each other at their edges by a peripheral weld seam 3, the weld seam 3 being formed with an inward-directed weld bead 4 which faces the cushioning member 1 and thus is of high strength. FIG. 2 shows that the weld seam 3 is particularly clean, i.e., free of protrusions of burrs, and thus corresponds to the appearance that is obtained by a butt weld seam.

FIG. 3 shows the cushioning member 1, on each of the main surfaces of which a blank 2 of wrapping material has been placed. The blanks 2 are larger in area than the peripheral contour of the cushioning member 1 so that each blank 2 forms a peripherally protruding flange 5 in the center plane 6 of the cushioning member. The flanges 5 are clamped between two opposed web electrodes 7, 8 (FIGS. 4 and 5). The flanges 5 are peripherally welded to each other by high-frequency welding is such a manner that an inward-directed weld bead 4 is formed by flow of material at the flange edges facing the member. The cushioning member 1 preferably has a circumferential groove 9 in the center plane 6 of the cushioning member, within which groove the weld bead 4 can freely expand.

FIG. 4 shows basic principles of the method and apparatus of the invention. It can be seen that the flanges 5 are clamped between the opposed web electrodes 7 and 8, which are movable relative to each other parallel to an axial center line 10, which is perpendicular to the center plane of the cushioning member. FIG. 4 shows the condition immediately after completion of the weld seam and the development of the weld bead 4.

The process steps which follow the welding include punching the completely wrapped cushioning member 1 out from the flanges 5 by means of a punch 11 which is movable along the axial center line 10 and cooperates with the web electrode 8, which serves as a die.

The apparatus shown in FIG. 5 comprises an upper electrode plate 12 and a lower electrode plate 13, the plates being movable relative to each other along the axial center line 10 by means of column guides 14. The upper electrode plate 12 bears on its lower side the web electrode 7, which is supported by springs 15 against the electrode plate 12, and, within the receiving space 16 bounded by the web electrode 7, a punch 11 which is rigidly connected to the electrode plate 12. The lower electrode plate 13 bears the web electrode 8 on its upper side for mating with the web electrode 7, and, within the receiving space 16 bounded by it, a support member 17 which is movable along the axial center line 10 against the force of return springs 18.

The web electrode 7 has an inner surface which extends parallel to the axial center line and which rests against the peripheral surface of the punch 11 in the manner of a slide bearing. The web electrode 7 is furthermore provided on its end region facing the mating web electrode 8 with a welding web 19 which is substantially narrowed down as compared with the rest of its cross-section. The mating web electrode 8 is developed with a welding web 20 which protrudes in flange-like manner inward and therefore into the receiving space 16. The inner surface of the welding web 20 is aligned with the inner surface of the welding web 19 and thus extends parallel to the axial center line 10, while the surface facing the web electrode 7 is directed perpendicular to the center line 10. The transition between the two welding webs 19, 20 takes place at a sharp angle.

The cross-sectional opening of the web electrode 8 is precisely adapted in the region of the welding web 20 to the peripheral contour of the punch 11, so that the punch 11 can pass the shearing fashion along the welding web 20. The structural development of the web electrodes 7 and 8 assures the formation of an inward-directed weld bead 4 and furthermore makes possible the formation of a second weld bead 21, which may possibly make it unnecessary to increase the clamping pressure of the web electrodes 7, 8 during the punching.

The support member 17 and the punch 11 are provided on their sides which face each other with respective trough-like recesses 22, 23. These recesses supplement each other to form a mold cavity 24 which closely surrounds the cushioning member 1 and blanks 2.

One proceeds as follows in order to produce a wrapping: Initially, the apparatus shown in FIG. 5, which can be clamped in an ordinary welding press, is in an open position, the electrode plates 12 and 13 being spaced apart by a distance which permits insertion of the cushioning member 1 into the mold cavity 24. A first blank 2 of the wrapping material is first inserted into the trough-like recess 22 of the support member 17. Then the cushioning member 1 is placed on said blank 2, and the second blank 2 is finally placed on the cushioning member 1. Since the blanks of wrapping material generally consist of resilient material, this material adapts itself to the contour of the trough-shaped recess 22 as well as to the contour of the cushioning member 1. In the inserted condition of the cushioning member 1 and blanks 2, there is obtained approximately the structure shown in FIG. 3. The electrode plates 12, 13 are new moved toward each other, the welding webs 19, 20 of the electrodes 7, 8 coming against each other and thereby clamping the flange 5. If desired, the distance between the weld webs 19, 20 can be varied or set to a fixed value by a stop, now shown in the drawing.

Then, by connecting the electrodes 7, 8 to a source of high-frequency voltage, the weld seam 3 and weld bead 4, and possibly weld bead 21, are now formed. After the completion of the welding process, the electrode plate 12 is moved farther in the direction toward the electrode plate 13. At the same time, the punch is also moved downward, and upon this movement, punches the wrapping material in the immediate vicinity of the flange edges which face the cushioning member. By this action the punch 11 enters into the interior of the web electrode 8 which thereby serves as a die.

As a result of the stroke of the punch, which acts directly on the wrapped cushioning member 1, the support member 17 also moves, against the force of the return springs 18, in the direction toward the electrode plate 13. As soon as the punch 11 is moved back, the return springs 18 press the support member 17, and thus the cushioning member 1, back into their original position. The completely wrapped cushioning member 1 can then be removed from the apparatus.

As mentioned above, cushioning members produced by the method and apparatus disclosed herein are completely free of burrs in the region of the weld seam. This system is simple and inexpensive to operate and avoids the disadvantages of the prior art discussed previously.

Although embodiments of the invention have been described herein, the invention is not limited to such embodiments. Rather, other modifications and variations that may occur to one skilled in the art are also to be considered within the spirit and scope of the invention, as defined in the claims.

What is claimed is:

1. A method of wrapping a cushioning member having two main surfaces with a web of wrapping material formed of two blanks, comprising the steps of:
    (a) placing each of the blanks adjacent to a respective one of the main surfaces of the cushioning member, the peripheral portions of the two blanks forming respective flanges which project peripherally from the cushioning member;
    (b) clamping the flanges between first and second opposed web electrodes and applying energy thereto, so as to weld the flanges together and form an inward-directed weld bead by a flow of web material from the weld toward the cushioning member;
    (c) locating a support member against one of the main blanks;
    (d) locating a punch facing the other one of the blanks;
    (e) retaining the flanges clamped between the electrodes;
    (f) operating the punch, while the flanges are clamped between the electrodes, to separate and move the cushioning member away from the flanges by engaging and thereby severing the flanges immediately adjacent to the cushioning member; and
    (g) supporting the cushioning member with the support member while the cushioning member is moving away from the flanges.

2. A method as in claim 1, further comprising employing one of the web electrodes as a die for cooperating with the punch to sever the flanges.

3. A method as in claim 2, further comprising employing the other of the web electrodes as a holder for holding the flanges as they are severed by the punch.

4. A method as in claim 1, further comprising moving the punch substantially perpendicularly to a center plane defined by the cushioning member and the flanges.

5. A method as in claim 1, including applying a high-frequency welding voltage to the web electrodes.

6. A method as in claim 1, wherein the cushioning member is separated from the flanges after completion of the welding and termination of the applying of energy to the electrodes.

7. A method as in claim 1, further comprising increasing the clamping pressure prior to separating the cushioning member from the flanges 8. A method as in claim 1, wherein the support member is shaped to extend over and substantially coincide with the one of the main blanks which it faces.

9. A method as in claim 1, wherein the blanks are comprised of non-weldable material and further including the step of applying a weldable material over the blanks prior to placing the blanks adjacent the cushioning member.

10. An apparatus for wrapping a cushioning member with a web of wrapping material formed of two blanks, the two blanks being placed on respective main surfaces of the cushioning member so as to form respective flanges projecting peripherally from the cushioning member, the apparatus comprising:
 (a) first and second opposed web electrodes which are movable relative to each other along a common axial center line thereof, the web electrodes each defining a portion of a space for receiving the cushioning member with the flanges projecting away from the cushioning member and between the web electrodes;
 (b) a punch within the receiving space portion defined by the first web electrode, which is movable toward the receiving space portion of the second web electrode along said common axial center line, and has a continuous cutting edge for shearing said cushioning member from said flanges immediately adjacent to the second web electrode when the punch is so moved, the second web electrode serving as a die for the punch; and
 (c) a support member for supporting the cushioning member within the receiving space portion defined by the second web electrode, said support member being movable with said cushioning member along said axial central line while supporting said cushioning member.

11. An apparatus as in claim 10, further comprising return springs, said support member being movable along said axial center line against the force of said return springs.

12. An apparatus as in claim 11, wherein the punch and the support member have respective trough-shaped recesses in said respective receiving space portions, said recesses defining a mold cavity for closely surrounding such cushioning member, said mold cavity further defining a slot for accommodating said projecting flanges, the slot being located for being traversed by the punch as it is moved for shearing the flanges from the cushioning member.

13. An apparatus as in claim 10, wherein the support member is contoured to closely fit that one of the major faces of the cushioning member which it faces.

* * * * *